Feb. 19, 1929.  1,702,336
G. M. CAUSEY ET AL
CONTROL MECHANISM FOR PIPE CUTTERS AND THREADERS
Original Filed March 1, 1926     4 Sheets-Sheet 1
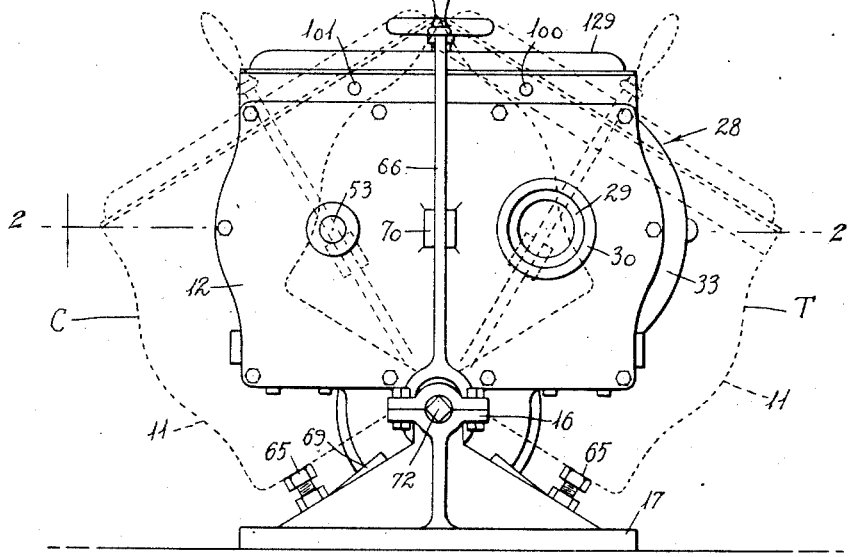
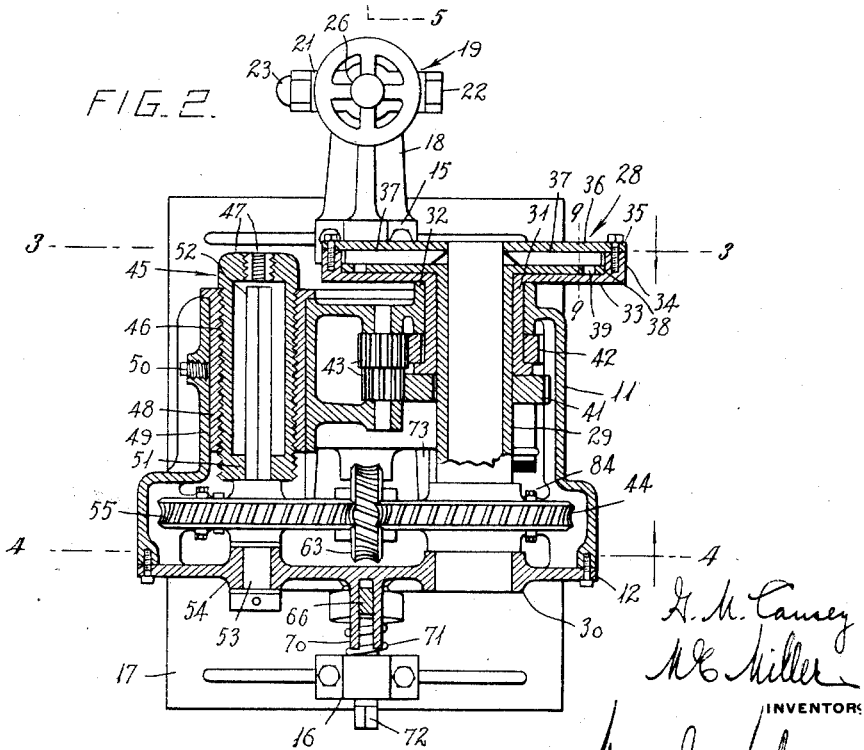
G. M. Causey
M. E. Miller
INVENTORS
Monroe E. Miller
ATTORNEY

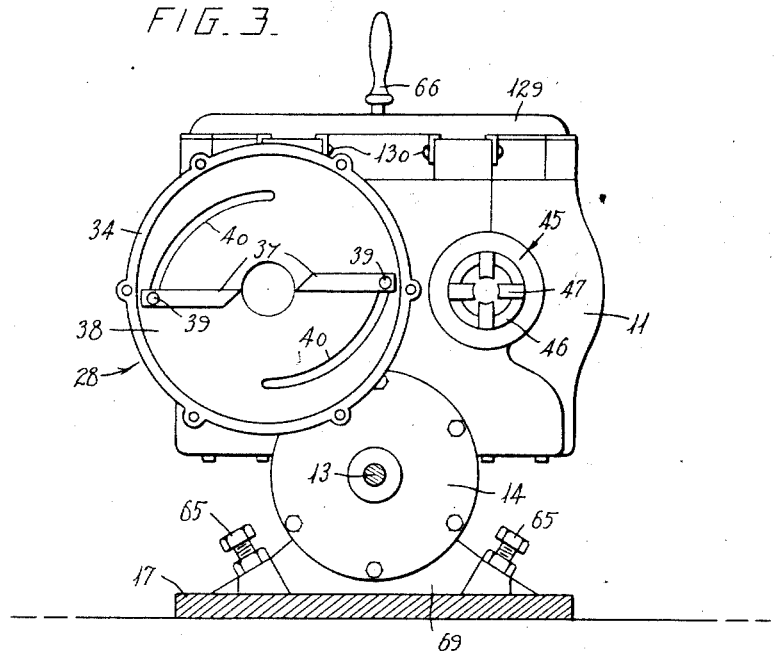
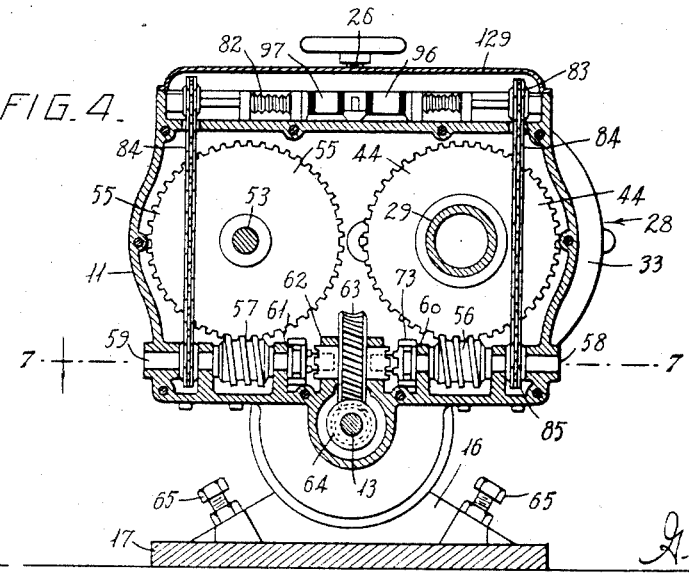

Feb. 19, 1929.  
G. M. CAUSEY ET AL  
1,702,336  
CONTROL MECHANISM FOR PIPE CUTTERS AND THREADERS  
Original Filed March 1, 1926    4 Sheets-Sheet 3
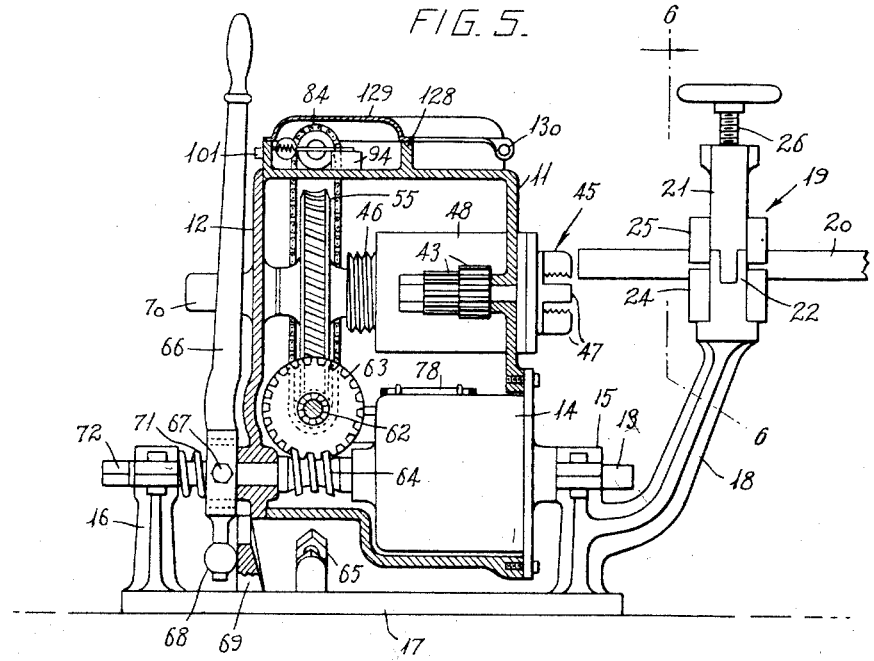
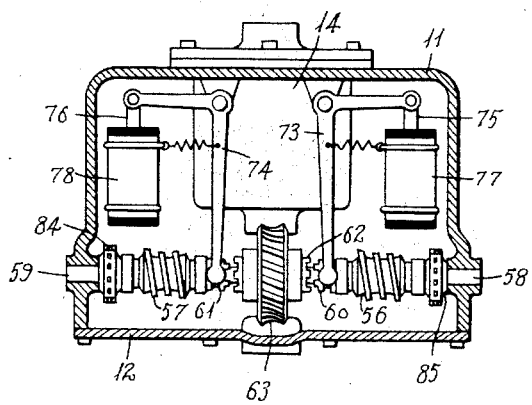
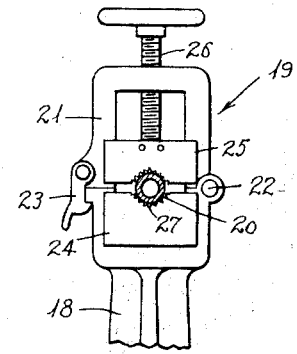

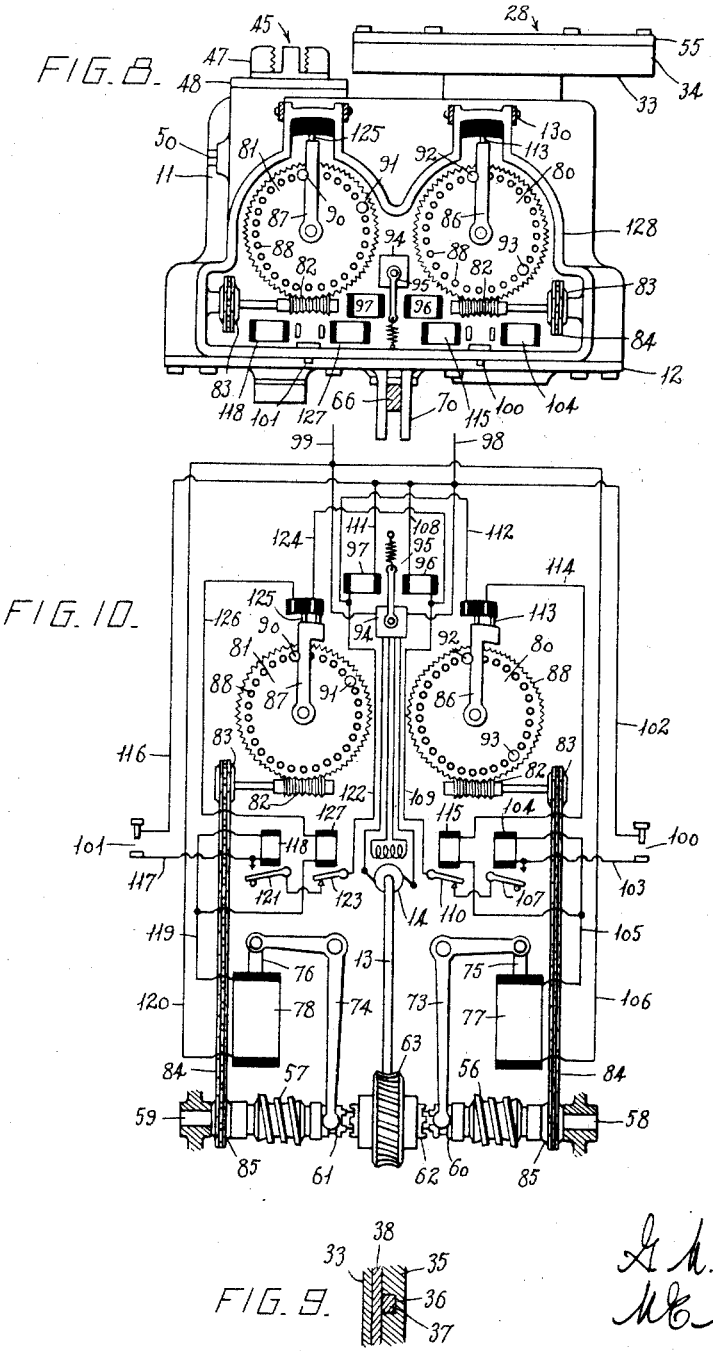

Patented Feb. 19, 1929.

1,702,336

UNITED STATES PATENT OFFICE.

GUY M. CAUSEY, OF SALEM, OREGON, AND MONROE E. MILLER, OF WASHINGTON, DISTRICT OF COLUMBIA; SAID MILLER ASSIGNOR TO SAID CAUSEY.

CONTROL MECHANISM FOR PIPE CUTTERS AND THREADERS.

Original application filed March 1, 1926, Serial No. 91,524. Divided and this application filed July 10, 1926. Serial No. 121,677.

The present invention relates to control mechanism for pipe cutters and threaders and other machines, and this application is a division of application filed March 1, 1926, Serial No. 91,524.

The object of the invention is the provision of a machine, such as for cutting and threading pipes, operated by an electric motor or other prime mover so as to eliminate manual effort for cutting and threading the pipes, and the machine being automatic in operation after the parts have been properly positioned and the operation started. Thus, when a pipe is positioned and clamped the pipe cutter may be started, such as by touching a push button, and will complete its operation and reset itself, thereby cutting off the pipe at the predetermined point. Then, the machine may be controlled to position the parts for the operation of the pipe threader, and said threader may be started into operation and will complete its operation and reset itself. Therefore, the only attention required on the part of the operator is to insert and clamp the pipe, with the pipe cutter in place, then start the pipe cutter, and after the pipe has been cut, to position the pipe threader for operation and start the operation thereof. This leaves the operator free to perform other work during the times that the pipe is being cut and threaded.

Another object is the provision of novel controlling means for the actuating means whereby the limits of movement of the cutting and threading means may be changed, for pipes of different diameters and for screw-threading the pipes for different distances.

Although the control mechanism is illustrated and described in connection with a pipe cutting and threading machine, it will be apparent that such mechanism will be used for other machines for which it is appropriate.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a rear view of the machine, showing the casing or body in intermediate position, and illustrating the cutting and threading positions thereof in dotted lines.

Fig. 2 is a horizontal section on the line 2—2 of Fig. 1, portions being shown in plan.

Fig. 3 is a vertical transverse section on the line 3—3 of Fig. 2 looking rearwardly.

Fig. 4 is a vertical transverse section on the line 4—4 of Fig. 2 looking forwardly.

Fig. 5 is a vertical longitudinal section on the line 5—5 of Fig. 1, portions being shown in elevation.

Fig. 6 is a section on the line 6—6 of Fig. 5 illustrating the pipe clamp or vise.

Fig. 7 is a horizontal section on the line 7—7 of Fig. 4, portions being shown in plan.

Fig. 8 is a top view illustrating the controlling means.

Fig. 9 is a sectional detail on the line 9—9 of Fig. 2.

Fig. 10 is a diagrammatical view to illustrate the electrical circuits and devices of the controlling means.

In carrying out the invention there is provided a casing or body 11 having the removable back wall 12 for access to the interior parts, and said casing is mounted for oscillation on a horizontal longitudinal shaft 13 which, as shown, is the armature shaft of an electric motor 14 that furnishes the power to operate the machine. Said motor is secured within the casing 11. The protruding front and rear terminals of the shaft 13 are journaled in bearings or pedestals 15 and 16, respectively, rising from a base 17 which may be supported on a bench, table or other suitable support.

The front pedestal 15 has an upwardly extending bracket 18 carrying the pipe clamp or vise 19 to receive and hold the pipe or rod 20 in the proper position for the operation of the cutter and threader on the rear portion of the pipe. The clamp 19 may be of any suitable construction. As shown, it comprises a yoke 21 having upper and lower sections hingedly connected at one side, as at 22, with the lower section secured on or integral with the bracket 18. The sections of the yoke are detachably connected at the opposite side by a latch or hook 23. Clamping blocks 24 and 25 are slidable in the lower and upper sections of the yoke 21, respectively, and a screw 26 is threaded through the upper portion of the yoke and is swivelled to the upper block 25 for raising and lowering it. The blocks 24 and 25 have toothed or serrated V-shaped notches or recesses 27 to receive and grip the pipe or rod 20 so as to center said pipe and secure it in the proper position for the operation thereon of the pipe cutter and the threader. The blocks 24 and 25, especially the block 24, may be used interchangeably with other blocks for different sizes of pipes, and the several pairs of blocks may have notches or recesses 27 of different sizes for pipes of different diameters. In this way, quick adjustments may be made for pipes of different diameters and such pipes will all be accommodated with their axes in the same line so as to properly register with the pipe cutter and the pipe threader. The pipe clamp or vise may also be used for holding a pipe or other object to be operated on for other purposes than cutting and threading by the present machine, inasmuch as such clamp or vise may be handy for other purposes and may eliminate the necessity for a separate pipe clamp or vise.

The pipe cutter 28 includes a tubular shaft 29 of sufficient diameter to receive the largest diameter of pipe for which the machine is intended, and the rear terminal of the shaft 29 is journaled in a bearing 30 with which the back wall 12 is provided. A sleeve 31 is rotatable on the shaft 29 near the forward end thereof and is journaled for rotation in a bearing 32 with which the front wall of the casing 11 is provided. The sleeve 31 has a disk 33 at its forward end provided with a forwardly extending rim or flange 34 against which a disk or plate 35 is detachably secured and provided with a central opening registering with the opening of the shaft 29. The disk or plate 35 has radial grooves 36 in its rear or inner side, in which cutter bits or members 37 are slidable to be projected into and retracted from the opening of the shaft 29 and cutter head. The inner ends of the bits 37 are sharpened so as to cut the pipe efficiently, and the bits 37 are automatically projected inwardly and retracted outwardly by the relative rotation of the shaft 29 and sleeve 31. For this purpose, the shaft 29 is provided at its forward end with a disk 38 between the disks 33 and 35 and rotatable relatively to the disks 33 and 35. Said disk 38 has spirally extending slots 40 receiving pins or lugs 39 on the bits 37, whereby the relative rotation of the disk 38 with reference to the disks 33 and 35 will slide the bits 37 inwardly and outwardly. The cutter head comprising the disks 33, 35 and 38 and bits 37 is located in front of the casing 11 with the axis of said head and shaft 29 horizontal and parallel with the shaft 13.

Gear wheels 41 and 42 of slightly different diameters are secured on the shaft 29 and sleeve 31 within the casing 11 and mesh with a double diametered pinion 43 mounted for rotation in the casing, in order that the sleeve 31 will rotate at a slightly different speed than the shaft 29, so as to project and retract the bits 37 when the shaft 29 is rotated in opposite directions. A worm wheel 44 is secured on the shaft 29 adjacent to the back wall 12 for rotating said shaft as will hereinafter more fully appear.

The pipe threader 45 is disposed with its axis parallel to the axis of the pipe cutter and the axis of the shaft 13, with the pipe cutter and pipe threader disposed side by side. The pipe threader includes a hollow cylindrical screw 46 having the inturned toothed portions 47 at its forward end constituting the threading die. The screw 46 is screw-threaded within a sleeve 48 that is fitted removably in a bearing 49 with which the casing 11 is formed, said sleeve 48 being readily slid rearwardly into the bearing 49, and said bearing carrying a set screw 50 or other means for clamping the sleeve in place. The threading die 47 may be used interchangeably with other dies for pipes of different diameters. Thus, screws 46 having dies of different sizes may be used interchangeably, and each screw has a sleeve 48, with the screw thread between the screw and sleeve of the same pitch as the thread of the die 47. Thus, when the screw 46 is rotated in the sleeve it will be projected and retracted so that the die 47 will move properly on the pipe.

In order to rotate the screw 46 it is provided at its rear end with an aperture 51 of square or non-circular form slidably receiving the forward terminal 52 of a shaft 53, said terminal 52 being of square or non-circular cross-section so that the screw 46 will rotate with the shaft, and permitting the screw to move forwardly and rearwardly on the shaft. The shaft 53 is journaled in a bearing 54 with which the back wall 12 of the casing is provided, and a worm wheel 55, corresponding with the worm wheel 44, is secured on the shaft 53 between the screw 46 and wall 12.

The operative connection between the motor and the cutter and threader includes worms 56 and 57 below and meshing with the worm wheels 44 and 55, respectively, and secured on the corresponding alining shafts 58 and 59 journaled in the casing 11 below the worm wheels. Clutch members 60 and 61 are slidable on and rotatable with the respective shafts 58 and 59 and are engageable with the clutch hub 62 of a worm wheel 63 journaled in the casing between the shafts 58 and 59. Said worm wheel 63 engages a worm 64 secured on the drive shaft 13. When the clutch members 60 and 61 are moved into engagement with the clutch hub 62, the shafts 58 and 59 are connected with the motor 14 for driving the pipe cutter and pipe threader, respectively.

Adjustable stops, such as screws 65, are carried by the base 17 for the contact of the bottom of the casing 11 in order to limit the oscillatory movement of said casing when swung to cutting and threading positions.

The casing 11 is slidable forwardly and rearwardly on the base, the shaft 13 being slidable in the pedestals 15 and 16, and an upwardly extending hand lever 66 is fulcrumed, as at 67, to the rear wall 12 of the casing adjacent to the shaft 13, and has a spherical roller 68 at its lower end bearing forwardly against an abutment 69 upstanding from the base. The rear wall 12 has rearwardly extending lugs or arms 70 between which the lever 66 extends, in order that the casing will oscillate transversely with the lever. A coiled spring 71 surrounds the shaft 13 and is confined between the pedestal 16 and the casing, to normally move the casing forwardly. By swinging the lever 66 rearwardly, the casing is shifted rearwardly.

The rear terminal of the shaft 13 has a square or non-circular portion 72 for the engagement of a crank or other implement for manually operating the machine, when desired, such as when the electric current for the motor fails.

The clutches for connecting the cutter and threader with the motor are controlled electrically as shown. Thus, as seen in Fig. 7, levers 73 and 74 are fulcrumed within the casing 11 and have suitable connections with the clutch members 60 and 61, respectively, and the cores 75 and 76 of solenoids 77 and 78, respectively, are connected with said levers. When said solenoids or electromagnets are energized the levers are swung to move the clutch members into connection with the clutch hub 62.

The automatic controlling means for the motor 14 and clutch operators, shown in Figs. 8 and 10, comprise the control wheels 80 and 81 for the pipe cutter and pipe threader, respectively. Said wheels are operatively connected with the respective actuating means for the cutter and threader. As shown, the wheels 80 and 81 are worm wheels and engage worms 82 to which are secured sprocket wheels 83, and sprocket chains 84 connect the wheels 83 with sprocket wheels 85 secured on the shafts 58 and 59. The wheels 80 and 81 are located on the top of the casing 11, and the chains 84 extend downwardly from the sprocket wheels 83 to the sprocket wheels 85. The gear ratio between the shafts 58 and 59 and the wheels 80 and 81, respectively, is such that for the maximum movements of the pipe cutter and pipe threader the control wheels 80 and 81 will rotate less than a complete revolution, and the limits of movement of the pipe cutter and pipe threader may be regulated, to adjust the movement of the pipe cutter to the diameter of the pipe being cut, and to adjust the movement of the pipe threader according to the length of the portion of the pipe to be threaded.

Arms 86 and 87 are mounted to turn on the pivots or axles of the wheels 80 and 81, respectively, and the wheels have annular series of apertures or sockets 88. Pins or pegs 92 and 93 are engageable in the apertures 88 of the pipe cutter control wheel 80, and similar pins or pegs 90 and 91 are engageable in the apertures 88 of the pipe threader control wheel 81. By adjusting the pegs 90, 91, 92 and 93 it is possible to regulate the opposite limits of movement of the pipe cutter and pipe threader.

In the arrangement as shown, the motor 14 is a reversible motor, and is controlled by a reversing switch 94 having a control lever 95 forming or provided with an armature located between the opposing electromagnets 96 and 97. The wires or conductors 98 and 99 of the electric power circuit are connected through the switch 94 with the field coil and armature of the motor 14, and the motor is stopped when the lever 95 is in its normal intermediate or neutral position. When the lever 95 is attracted by the energized magnet 96, the motor will operate in one direction, whereas when the armature lever 95 is attracted by the energized magnet 97, the motor is operated in the opposite direction.

Push buttons or other suitable switches 100 and 101 are carried by the casing 11 for starting the operation of the pipe cutter and pipe threader, respectively. The remaining elements of the electrical control will be described in connection with the operation of the machine.

In operation, when a pipe is to be cut, the casing 11 is swung to cutting position C, as seen in Fig. 1, which will bring the pipe cutter 28 into registration and alinement with the clamp or vise 19. The pipe is then inserted in the clamp and cutter, and may extend completely through the shaft 29. The cutting bits or members 37 are normally retracted so as not to interfere with the introduction of the pipe into the cutter. The operator then touches the push button switch 100, which will start the operation of the pipe cutter, and no further attention on the part of the operator is required until the operation has been completed. When the switch 100 is closed this completes a circuit including the conductor 98, a conductor 102, switch 100, a conductor 103, an electromagnet 104, a conductor 105, solenoid 77, a conductor 106, and conductor 99. The solenoid 77 is therefore energized to move the clutch member 60 into engagement with the clutch hub 62, thereby connecting the pipe cutter with the motor. The magnet 104 controls a switch 107 which is normally open, so that said switch is closed when said magnet 104 is energized by the closing of the switch 100. The switch 107 being closed completes a circuit including the conductor 98, a conductor 108, magnet 96, a conductor 109, a switch 110, switch 107, magnet 104, conductor 105, solenoid 77, and conductors 106 and 99. The magnet 96 moves the lever 95 and operates the switch 94 to connect the motor 14 with the conductors 98 and 99, so as to rotate the motor in one direction, and this will rotate the shaft 29 in the proper direction to cut the pipe, the solenoid 77 being kept energized so as to hold the clutch closed between the motor and shaft 29. The shaft 29 being rotated will, through the gear wheels 41 and 42 and pinion 43, rotate the sleeve 31. The bits 37 are rotated with the disks 33 and 35, clockwise as seen in Fig. 3, and said disks rotate slightly faster than the disk 38, in view of the slight difference in speed between the shaft 29 and sleeve 31. Therefore, as the cutter head rotates the pins 39 are made to move along the slots 40 of the disk 38, which will force the bits 37 inwardly slowly to engage and cut through the pipe.

During the time that the cutter head is being rotated to cut the pipe, the control wheel 80 is being rotated counter clockwise, as seen in Figs. 8 and 10, thereby moving the peg 92 away from the arm 86 and moving the peg 93 toward said arm. The peg 93 is so adjusted that when the pipe has been cut, the peg 93 contacts with and swings the arm 86 so as to close a switch 113 between conductors 112 and 114, in order to reverse the operation of the cutter and retract the bits 37 thereof. When the switch 113 is closed, by the contact of the peg 93 with the arm 86, a circuit is completed including the conductor 98, a conductor 111, magnet 97, conductor 112, switch 113, conductor 114, an electromagnet 115 controlling switch 110, conductor 105, solenoid 77, conductor 106 and conductor 99. The magnet 115 being energized will open the switch 110, thereby opening the circuit of the magnet 96 but the solenoid 77 is kept energized. The magnet 97 being energized will attract the lever 95 and reverse the switch 94, so as to reverse the motor 14. The motor is therefore operated to rotate the pipe cutter in the opposite direction, and naturally the bits 37 will be retracted. During this reverse or resetting movement of the pipe cutter, the control wheel 80 rotates clockwise, as seen in Figs. 8 and 10, so that the peg 93 moves away from and the peg 92 moves toward the arm 86. Said arm remains in either position by friction, so that the switch 113 remains closed while the pipe cutter is being returned to initial position. When the bits 37 have been retracted from the pipe, the peg 92, which has been adjusted to a suitable position on the wheel 88, contacts with the arm 86 and moves said arm to open the switch 113. This will open the circuit of the magnet 97 and solenoid 77, thereby stopping the motor 14 and opening the clutch between the motor and pipe cutter, thereby completing the operation in cutting the pipe and resetting the pipe cutter for the next operation. The machine may be used for cutting pipes or rods exclusively if desired. The pieces of pipe that are cut are removed prior to or during the insertion of the next pipes to be cut. Thus, if there is a piece of pipe in the shaft 29, the next pipe when inserted through the clamp 19 and into the shaft 29 will dislodge the piece of pipe through the rear end of the shaft 29, or such piece may be removed previously by the operator.

When the pipe held by the clamp 19 is to be threaded, after the operation of the pipe cutter as aforesaid, the lever 66 is swung rearwardly, thereby shifting the casing 11 rearwardly, so as to withdraw the cutter head from the end of the pipe, and the lever 66 is then swung to tilt the casing 11 from cutting position to threading position T, as seen in Fig. 1. This brings the pipe threader 45 into registration and alinement with the pipe. The operator then touches the push button switch 101, and the control of the pipe threader is similar to the control of the pipe cutter as above described. Thus, when the switch 101 is closed this completes a circuit including the conductor 98, a conductor 116, switch 101, a conductor 117, an electromagnet 118, a conductor 119, solenoid 78, a conductor 120, and conductor 99. This energizes the solenoid 78 to close the clutch between the motor and pipe threader, by moving the clutch member 61 into engagement with the clutch hub 62. The switch 121 controlled by the magnet 118 is closed, thereby completing a circuit including the conductor 98, conductor 111, magnet 97, a conductor 122, a switch 123, switch 121, magnet 118, a conductor 119, solenoid 78, conductor 120 and conductor 99. The lever 95 is moved by the magnet 97 to operate the motor 14 in the corresponding direction, thereby rotating the shaft 53. This will rotate the screw 46 in one direction so as to move the screw forwardly and the threading die 47 moves over the end of the pipe and cuts the thread thereon. The distance that the die 47 moves on the pipe is determined by the position of the peg 91 on the wheel 81. The wheel 81 moves counter-clockwise, as seen in Figs. 8 and 10, as the die 47 is being moved forwardly on the pipe. When the peg 91 contacts with the arm 87 it moves said arm to close a switch 125, thereby completing an electric circuit including the conductor 98, conductor 108, magnet 96, conductor 124, switch 125, conductor 126, an electromagnet 127 controlling switch 123, conductor 119, solenoid 78, conductor 120 and conductor 99. The switch 123 is therefore opened to open the circuit of the magnet 97, but the solenoid 78 is kept energized to hold the corresponding clutch closed. The magnet 96 is energized to reverse the switch 94 and motor 14, thereby rotating the shaft 53 and screw 46 in the opposite direction, in order to retract the threading die 47 and reset the pipe threader. During such return movement the wheel 81 rotates clockwise, as seen in Figs. 8 and 10, thereby moving the peg 91 away from and the peg 90 toward the arm 87, said arm 87 remaining in position with the switch 125 closed. When the pipe threader has been returned to initial or normal position, the peg 90 contacts with and swings the arm 87 to open the switch 125, thereby deenergizing the magnet 96 and solenoid 78, to stop the motor 14 and open the clutch between the motor and pipe threader. If desired, the machine may be used exclusively for threading pipes by leaving the casing 11 in threading position and replacing the pipes in the clamp or vise 19. By changing the position of the peg 91 it is possible to control the longitudinal movement of the screw 46 and threading die 47 to cut the thread on the pipe to different distances from the end of the pipe, within the limit or forward movement of the screw 46 when projected from the casing.

The pipe cutter will operate on pipes of different diameters, and the sleeve 48 may be readily withdrawn from the casing to be substituted by a sleeve containing a screw and die for pipes of different diameter, and the clamp or vise 19 may also be quickly adjusted for pipes of different diameter.

The gears and parts within the casing 11 may run in oil, and the bits 37 and cutting die 47 may be supplied with oil to facilitate the cutting and threading of the pipe and to reduce friction and heat.

As shown, the control wheels 80 and 81, motor reversing switch 94, and magnets 96, 97, 104, 115, 118 and 127 are located on the top of the casing 11 within a surrounding flange 128, and a cover 129 seats on said flange over said parts and is hinged, as at 130, so that it may be swung open for adjusting the pegs 90, 91, 92 and 93.

Having thus described the invention, what is claimed as new is:—

1. In a machine of the character described, means movable in one direction to operate on an object and having a reverse movement to reset said means, actuating means operably connected with the firstnamed means, control means operated by the actuating means at the opposite limits of movement of the firstnamed means, and electromagnetic means controlling the actuating means and controlled by said control means to automatically reverse the firstnamed means after a predetermined operation on the object and to stop said firstnamed means when it is reset.

2. In a machine of the character described, rotatable means to operate on an object, actuating means operably connected with said rotatably means for rotating it in opposite directions, control means arranged to be operated when the rotatable means reaches the opposite limits of rotary movement, and electromagnetic means controlling the actuating means and controlled by said control means to reverse the movement of the rotatable means when it reaches a predetermined limit of movement in one direction and to stop said rotatable means when it reaches its limit of movement in the opposite direction 3. In a machine of the character described, means operable in one direction to operate on an object and having a reverse movement to reset said means, actuating means operably connected with the firstnamed means, control means operably connected with the firstnamed means and including portions adapted to contact at opposite limits of movement of the firstnamed means, manually operable means controlling the actuating means to bring same into operation for moving the firstnamed means in the direction to operate on the object, and electromagnetic means controlled by said contacting portions and controlling the actuating means to reverse the movement of the firstnamed means when it reaches the predetermined limit of movement after operating on the object and to stop the firstnamed means when it has been reset.

4. In a machine of the character described, two devices for operating on an object, a reversible electric motor, an operative connection between said motor and each of said devices including a clutch, control means operable with said devices, electromagnetic means controlled by said control means and controlling the motor and the clutches for reversing the motor when either device has been operated to operate on the object so as to reset such device, open the clutch and stop the motor when said device has been reset, and manually operable means controlling said electromagnetic means to selectively close either of said clutches and to thereby start the motor.

5. A machine of the character described, comprising two devices operable on an object, a reversible electric motor, motor controlling means, operative connections between said motor and devices including clutches, control means operable with said devices, selective manually operable means for closing the clutches and controlling said motor controlling means to start the motor and close the corresponding clutch to operate either of said devices, and electromagnetic means controlled by said control means and controlling said motor controlling means and the clutches for reversing the motor when either device has been operated to operate on the object, so as to reset said device, open the corresponding clutch and stop the motor when said device has been reset.

6. A machine of the character described comprising two devices for operating on an object, actuating means, manually operable means for selectively connecting said actuating means with either of said devices to operate the selected device in opposite directions, and control means operable with said devices, and electromagnetic means controlled by the control means and controlling said actuating means to reverse the selected device after same has operated on the object and for stopping said device when it has been reset.

7. In a pipe cutter and threader, a pipe cutter, a pipe threader, a reversible electric motor, operative connections between said motor and the cutter and threader including clutches, control means operable with the cutter, other control means operable with the pipe threader, means controlled by the firstnamed control means and controlling the motor and the clutch between the motor and cutter for reversing the motor when the cutter has been operated to cut the pipe so as to reset the cutter and opening the clutch and stopping the motor when the cutter has been reset, and means controlled by the secondnamed control means and controlling the motor and the clutch between the motor and threader for reversing the motor when the threader has been operated to thread the pipe so as to reset the threader and opening the clutch and stopping the motor when the threader has been reset.

8. A pipe cutter and threader comprising a pipe cutter, a pipe threader, a reversible electric motor, motor controlling means, operative connections between said motor and the pipe cutter and pipe threader including clutches, control means operable with the pipe cutter, other control means operable with the pipe threader, selective means for closing the clutches and controlling said motor controlling means to start the motor and close the corresponding clutch to operate either the pipe cutter or the pipe threader, means controlled by the firstnamed control means and controlling said motor controlling means and the clutch between the motor and cutter for reversing the motor when the cutter has been operated to cut the pipe so as to reset the cutter, and opening said clutch and stopping the motor when the cutter has been reset, and means controlled by the secondnamed control means and controlling the motor controlling means and the clutch between the motor and threader for reversing the motor when the threader has been operated to thread the pipe so as to reset the threader, and opening the lastnamed clutch and stopping the motor when the threader has been reset.

9. A pipe cutter and threader comprising a pipe cutter, a pipe threader, actuating means, means for selectively connecting said actuating means with either the pipe cutter or the pipe threader to operate same in opposite directions, control means operable with the pipe cutter and the pipe threader, and electromagnetic means controlled by said control means and controlling said actuating means to reverse the pipe cutter or the pipe threader after same has operated on the pipe and for stopping the cutter or the threader when same has been reset.

In testimony whereof we hereunto affix our signatures.

GUY M. CAUSEY.
MONROE E. MILLER.